US010712278B2

(12) United States Patent
Santori et al.

(10) Patent No.: US 10,712,278 B2
(45) Date of Patent: *Jul. 14, 2020

(54) ANALYTE DETECTION PACKAGE WITH INTEGRATED LENS

(71) Applicant: Hewlett-Packard Development Company, L.P., Houston, TX (US)

(72) Inventors: Charles M. Santori, Palo Alto, CA (US); Ning Ge, Palo Alto, CA (US); Zhiyong Li, Palo Alto, CA (US); Steven Barcelo, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/569,764

(22) PCT Filed: Jun. 29, 2015

(86) PCT No.: PCT/US2015/038362
§ 371 (c)(1),
(2) Date: Oct. 27, 2017

(87) PCT Pub. No.: WO2017/003435
PCT Pub. Date: Jan. 5, 2017

(65) Prior Publication Data
US 2018/0143139 A1    May 24, 2018

(51) Int. Cl.
*G01N 21/03* (2006.01)
*G01N 21/65* (2006.01)
*G01N 21/11* (2006.01)

(52) U.S. Cl.
CPC .......... *G01N 21/658* (2013.01); *G01N 21/03* (2013.01); *G01N 21/11* (2013.01)

(58) Field of Classification Search
CPC .................. G01N 21/658; G01N 21/0303
See application file for complete search history.

(56) References Cited

U.S. PATENT DOCUMENTS

| 5,255,067 | A * | 10/1993 | Carrabba | G01J 3/44 356/301 |
| 6,862,398 | B2 * | 3/2005 | Elkind | G01N 21/553 356/445 |
| 7,548,313 | B2 | 6/2009 | Nguyen | |
| 7,884,930 | B2 | 2/2011 | Kirby et al. | |
| 8,670,119 | B1 | 3/2014 | Bratkovski et al. | |

(Continued)

FOREIGN PATENT DOCUMENTS

| CN | 2499825 | 7/2002 |
| CN | 1677087 | 10/2005 |

(Continued)

OTHER PUBLICATIONS

Lin, En-Chiang et al. "Effective Localized Collection and Identification of Airborne Species through Electrodynamic Precipitation and SERS-Based Detection." Nature Communications 4 (2013): 1636—PMC Web Jun. 4, 2015.

*Primary Examiner* — Rebecca C Bryant
(74) *Attorney, Agent, or Firm* — Rathe Lindenbaum LLP

(57) ABSTRACT

Provided in one example is an analyte detection package that includes a chamber, a surface-enhanced luminescence analyte stage within the chamber, and a lens integrated as part of the package to focus radiation onto the analyte stage.

20 Claims, 7 Drawing Sheets

(56) References Cited

U.S. PATENT DOCUMENTS

| | | | |
|---|---|---|---|
| 9,030,659 B2* | 5/2015 | Tysk | G01N 21/67 356/313 |
| 2005/0084980 A1 | 4/2005 | Koo et al. | |
| 2009/0147254 A1* | 6/2009 | Kirby | G01N 21/658 356/301 |
| 2013/0171685 A1 | 7/2013 | Schutze et al. | |
| 2014/0118731 A1 | 5/2014 | Ayers | |
| 2014/0199778 A1 | 7/2014 | Wu et al. | |
| 2015/0029505 A1 | 1/2015 | Tysk | |
| 2016/0109357 A1 | 4/2016 | Lorbeer et al. | |

FOREIGN PATENT DOCUMENTS

| | | |
|---|---|---|
| CN | 101978275 | 2/2011 |
| CN | 103389266 | 11/2013 |
| CN | 103579457 | 2/2014 |
| CN | 103797352 | 5/2014 |
| EP | 2884264 | 6/2015 |
| WO | WO-2014021808 | 2/2014 |
| WO | WO-2014025033 | 2/2014 |
| WO | WO-2015026297 | 2/2015 |

* cited by examiner

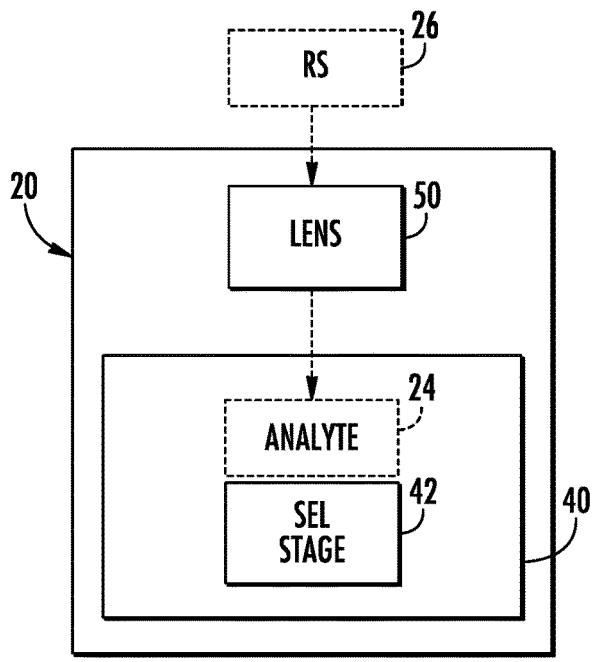

ANALYTE DETECTION PACKAGE WITH INTEGRATED LENS

BACKGROUND

Surface-enhanced luminescence techniques, such as surface-enhanced Raman spectroscopy (SERS), are sometimes used for analyzing the structure of inorganic materials and complex organic molecules. Surface enhanced luminescence techniques focus electromagnetic radiation or light onto an analyte, wherein the radiation scattered by the analyte is detected for analysis.

BRIEF DESCRIPTION OF THE DRAWINGS

FIG. 1 is a schematic diagram of an example analyte detection package.

FIG. 2 is a flow diagram of an example method for forming an example analyte detection package.

FIG. 3 is a flow diagram of an example method for using an example analyte detection package.

DETAILED DESCRIPTION OF EXAMPLES

Figure 4:
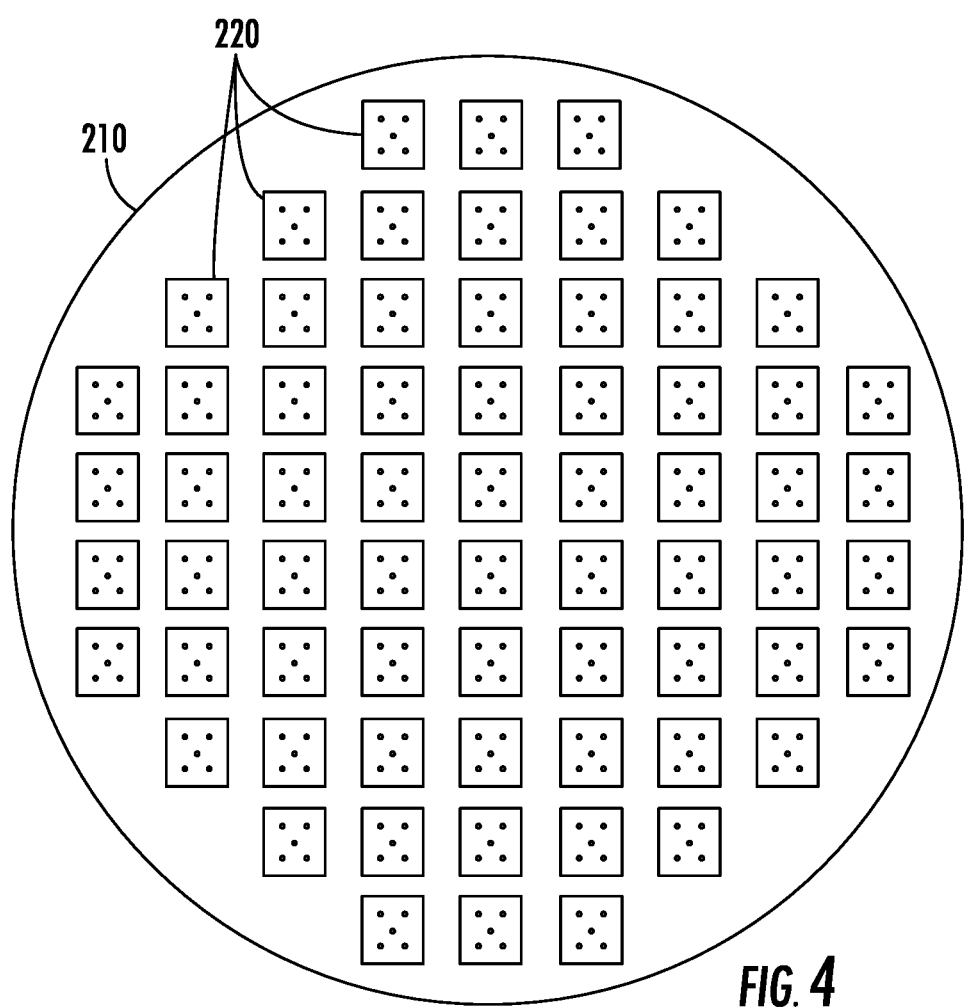
FIG. 4 is a top view of an example wafer including an array of example analyte detection packages.

FIG. 1 schematically illustrates an example analyte detection package 20. Package 20 comprises a self-contained unit that is to receive and contain an analyte 24 (schematically shown), while radiation from a radiation source 26 (schematically shown) is directed upon or is focused on the analyte 24, wherein the radiation scattered or re-emitted by the analyte is detected and analyzed to identify the structure of inorganic materials and complex organic molecules. Package 20 comprises chamber 40, surface-enhanced luminescence (SEL) analyte stage 42 and lens 50.

Chamber 40 comprises an enclosure forming a defined volume for receiving and containing the analyte 24. Chamber 40 additionally contains stage 42. In one implementation, chamber 40 is formed by a substrate and an opposite or overlying housing which cooperate to form chamber 40. In one implementation, walls of the chamber have a metal or metal alloy surface, such as a surface of nickel, gold, platinum, palladium or rhodium, or alloys thereof.

In one implementation, chamber 40 comprises a fill opening through which analyte 24 is deposited into chamber 40. In one implementation, the fill opening is closed by a removable seal that may be peeled away, punctured or torn to expose the fill opening. In one implementation, the opening is formed by peeling, puncturing or penetrating through a portion of the walls of chamber 40. In one implementation, chamber 40 is to be torn away or peeled away to form the fill opening. In another implementation, chamber 40 has a portion which is to be punctured. In yet another implementation, chamber 40 comprises a septum through which a needle is used to deposit analyte 24 into the interior of chamber 40.

Stage 42 comprises a surface enhanced illumination analyte stage within chamber 40. For purposes of this disclosure, a surface enhanced luminescence (SEL) analyte stage is any structure or particle that interacts with the deposited analyte so as to enhance the intensity of the radiation scattered or reemitted by the analyte. Stage 42 enhances the amount of radiation or the number of photons that are scattered or re-emitted by the analyte upon being impinged by radiation from radiation source 26.

In one implementation, stage 42 comprises an SEL structure or a group of SEL structures within chamber 40 upon which and about analyte 24 contacts. In one implementation, the SEL structures comprise enhanced fluorescence spectroscopy structures or enhanced luminescence spectroscopy structures. In one implementation, the SEL structures comprise surface enhanced Raman spectroscopy (SERS) structures. Such structures may include a metal surface or structure, wherein interactions between the analyte and the metal surface cause an increase in the intensity of the Raman-scattered radiation. Such metal surfaces may include a roughened metal surface or metal islands. In one implementation, such metal islands comprise columnar supports such as pillars, needles, fingers, particles or wires. In some implementations, the columnar structures may include a metal cap or head upon which analyte 24 may be deposited. In some implementations, such columnar structures are formed from materials and/or are dimensioned so as to bend or flex towards and away from one another in response to applied electric fields. In some implementations, the SERS structures are movable and are self-actuating, wherein such columnar structures bend or flex towards one another in response to micro-capillary forces so as to self-organize, wherein such bending facilitates close spacing between the structures for greater scattered radiation intensity.

In one implementation, the SEL or SER structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$.

In other implementations, stage 42 may comprise SEL particles. Examples of SEL particles include, but are not limited to, electrodes in electrolytic cells and metal colloid solutions.

Lens 50 comprises an optical component device that is to focus the radiation provided by radiation source 26 towards or at stage 42 and onto the analyte 24. Lens 50 is integrated as part of package 20. Such a lens in radiation system 26 may be omitted. Moreover, because lens 50 is integrated as part of packaging 20, rather than as part of an external radiation source 26, focusing control with lens 50 is enhanced. In one implementation, the depth of focusing control is enhanced from the level of a few millimeters to the level of a few micrometers. In one implementation, the depth of focusing provided by lens 50, integrated as part of package 20, is from 1 µm to 50 µm. In some implementations, the profile of lens 50 may be tuned for the particular analyte or type of analysis being carried out upon analyte 24. As a result, different packages 20 having different lens profiles may be provided for customized use to analyze different types of analytes. The different profiles of the different lenses 50 may be tuned during fabrication through adjustment of various process parameters when forming such lenses 50, such as the materials chosen for lenses 50, temperature, time and gravity direction.

FIG. 2 is a flow diagram outlining an example method 100 for forming package 20. As indicated by block 104, a package is formed or otherwise provided. The provided package has a chamber 40, a surface enhanced illumination stage 42 within the chamber 40 and an opening in communication with an interior of the chamber 40. As indicated by block 106, lens 50 is connected to the package 20 such that the lens 50 is supported by the package 20 and extends opposite the opening.

FIG. 3 is a flow diagram outlining an example method 150 for the use of package 20 when analyzing an analyte 24. As indicated by block 154, chamber 40 is filled (partially or fully) with a solution containing the analyte such that the analyte is in contact with a SEL stage 42 within the chamber 40. As indicated by block 156, radiation is focused on to the analyte within the chamber 40 with a lens 50 supported by the package 20. In one implementation, the analyte is dried or is allowed to dry (the liquid carrier of the analyte evaporating) within the chamber 40 prior to being impinged with the incident radiation focused by lens 50.

The radiation incident upon the analyte may be scattered by the analyte, or may be absorbed and re-emitted by the analyte. The scattered or re-emitted radiation may be sensed and detected. Signals resulting from the sensed or detected radiation may be analyzed to identify or determine characteristics of the analyte.

Figure 5:
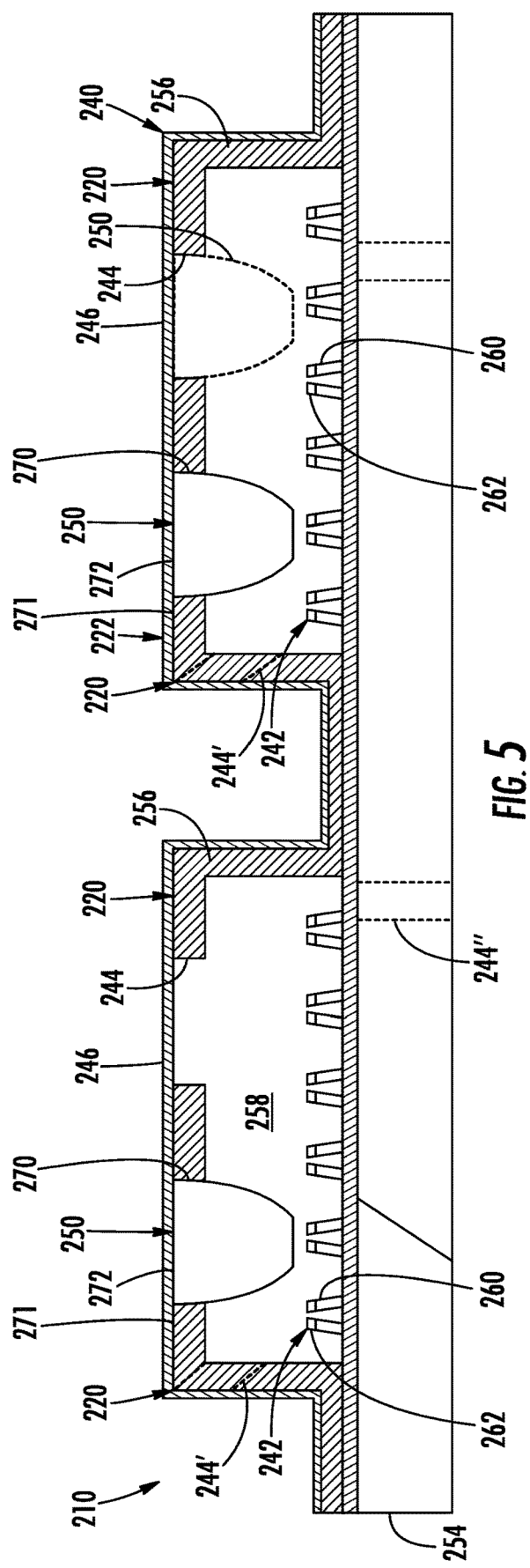
FIG. 5 is a sectional view illustrating a pair of the example analyte detection packages on the wafer of FIG. 4.

FIGS. 4 and 5 illustrate multiple analyte detection packages 220, example implementations of package 20. As shown by FIG. 4, packages 220 may be formed using semiconductor integrated circuit fabrication techniques as part of a wafer 210. The individual packages 220, formed as part of the wafer 210, are then subsequently separated into individual packages or individual sets of packages.

FIG. 5 is a sectional view illustrating two of the packages 220 formed as part of wafer 210. For ease of discussion, one of the packages 220 is described. As shown by FIG. 5, package 220 comprises chamber 240, surface enhanced illumination stage 242, fill opening 244, seal 246 and lens 250. Similar to chamber 40, chamber 240 comprises an enclosure forming a defined volume for receiving and containing an analyte 24 (shown in FIG. 1). Chamber 240 additionally contains stage 242. In the example illustrated, chamber 240 comprises a base or substrate 254 and housing 256. Substrate 254 serves as a platform upon which stage 242 is formed. Substrate 254 supports housing 256. Substrate 254 may be made from any suitable material such as silicon, glass, plastic, paper, polydimethylsiloxane, a transparent material, rubber and/or a membrane, for example.

Housing 256 extends from substrate 254. In the example illustrated, portions of stage 242 are anchored between substrate 254 and housing 256. In other implementations, housing 256 may contact and directly extend from substrate 254. Housing 256, sometimes referred to as an orifice plate, cooperates with substrate 254 to form and define the interior 258 of chamber 240.

Housing 256 protects stage 242 from exposure to the environment and reduces or prevents oxidation of surfaces of stage 242 prior to use. Housing 256 may additionally reduce or prevent unintentional or premature exposure of stage 242 to extraneous substances or an analyte that stage 242 is intended to detect. Although housing 256 and substrate 254 are illustrated as forming a rectangular shaped interior 258, in other implementations, chamber 258 may have other shapes.

In one implementation, housing 256 comprise walls that are formed by selectively plating a mandrel with a layer or layers of metal and subsequently removing the mandrel to form the housing with apertures. In one implementation, housing 256 has a metal surface such as nickel, gold, platinum or rhodium, for example. In one implementation, the walls of housing 256 are formed entirely from such a metal. In yet other implementations, housing 256 may be formed from non-metallic materials using processes other than plating.

SEL stage 242 comprises a surface enhanced luminescence (SEL) analyte stage within chamber 240. SEL stage 242 comprises structures that interact with the deposited analyte so as to enhance the intensity of the radiation scattered or re-emitted by the analyte. Stage 242 enhances the amount of radiation or the number of photons that are scattered or re-emitted by the analyte upon being impinged by radiation from a radiation source. In the example illustrated, stage 242 comprises columnar supports, pillars, needles, particles, wires or fingers 260. In the example illustrated, each of the fingers comprises include a metal cap or head up 262 upon which analyte may be deposited. In some implementations, such fingers 260 are formed from materials and/or are dimensioned so as to bend or flex towards and away from one another in response to applied electric fields or in response to micro-capillary forces so as to self-organize, wherein such bending facilitates close spacing between the structures for greater scattered radiation intensity. In one implementation, the fingers 260 have a nanometer scale to facilitate nano-enhanced Raman spectroscopy (NERS). Such nano-scale NERS structures may increase the intensity of radiation scattered by the analyte absorbed on such structures by a factor as high as $10^{16}$.

In other implementations, stage 242 may comprise other SEL structures such as enhanced fluorescence spectroscopy structures or enhanced luminescence spectroscopy structures. In yet other implementations, stage 242 may comprise particles, such as nanoparticles, that interact with the deposited analyte so as to enhance the intensity of the radiation scattered by the analyte. For example, in such other implementations, stage 242 may comprise electrodes in electrolytic cells or metal colloid solutions.

Fill opening 244 comprises a passage extending from the exterior of package to interior 258 of chamber 40. Fill opening 244 is sized and located to facilitate filling of interior 258 with the analyte to be tested. In the example illustrated, fill opening 244 extends through housing 256. As indicated by broken lines, in other implementations, package 220 may additionally or alternatively comprise other fill openings such as fill opening 244' extending through a side of enclosure 256 or fill opening 244" extending through substrate 254.

Seal 246 comprises a panel or layer of material coupled to a remainder of package 220 across fill opening 244. Seal 246 provides a hermetic seal to inhibit contamination of interior 258. Seal 246 inhibits oxidation of the metal surfaces within interior 258 prior to use of package 220. Seal 246 further indicates previous use of package 220. Seal 246 may be formed from a polymer tape, plastic, transparent material, plastic sheeting, foil material, foil sheeting, film, membrane, wax or polydimethylsiloxane.

When analyte is to be deposited within interior 258, seal 246 may be altered to provide access through fill opening 244. In one implementation, seal 246 is releasably or removably adhered to housing 256 by pressure sensitive adhesive or the like that allows seal 246 to be peeled away from fill opening 244. In yet another implementation, seal 246 is formed from a material and/or is dimensioned so as to be punctured through fill opening 244 and/or torn away from opening 244. In yet other implementations, seal 246 comprises a septum that allows insertion of a needle through opening 244, wherein the septum resiliently closes upon withdrawal of the needle. In yet other implementations, seal 246 is provided by a lid, top, door, hatch or cap that temporarily seals or closes opening 244. In some implementations, seal 246 is omitted.

Lens 250 comprises an optical device supported by housing 256 opposite to stage 242 so as to focus incident radiation onto portions of stage 242. In the example illustrated, lens 250 comprises a convex lens. In the example illustrated, lens 250 extends through and fills a bore or aperture 270 extending through housing 256. Lens 250 has an upper surface 272 inset within or flush with the outer surface 271 of housing 256, facilitating the covering of surface 272 with the membrane or film of seal 246 to protect the surface of lens 250 prior to use of lens 250. Lens 250 projects from aperture 270 into interior 258 into close proximity with stage 242. As a result, lens 250 may have enhanced focusing control depth as close as one micrometer to 50 μm with respect to analyte supported on top of stage 242. Because lens 250 is provided on package 220, depth of focus for distance control is automatically provided by package 220, where such control is more precise due to greater manufacturing control and reduced manufacturing tolerances associated with package 220.

As indicated by broken lines, in some implementations, packaging 220 may support a plurality of lenses 250. In one implementation, each of the plurality of lenses 250 focuses incident radiation towards portions of stage 242 and the contained analyte. In such implementations, one of the alternative fill openings 244', 244" are provided. In one implementation, where one of lenses 250 is angled, another of the plurality of lenses 250 may be used to focus scattered radiation towards a radiation detection device. Although two of such lenses 250 are shown, in other implementations, packaging 220 may support an larger number of lenses 250.

Figure 6:
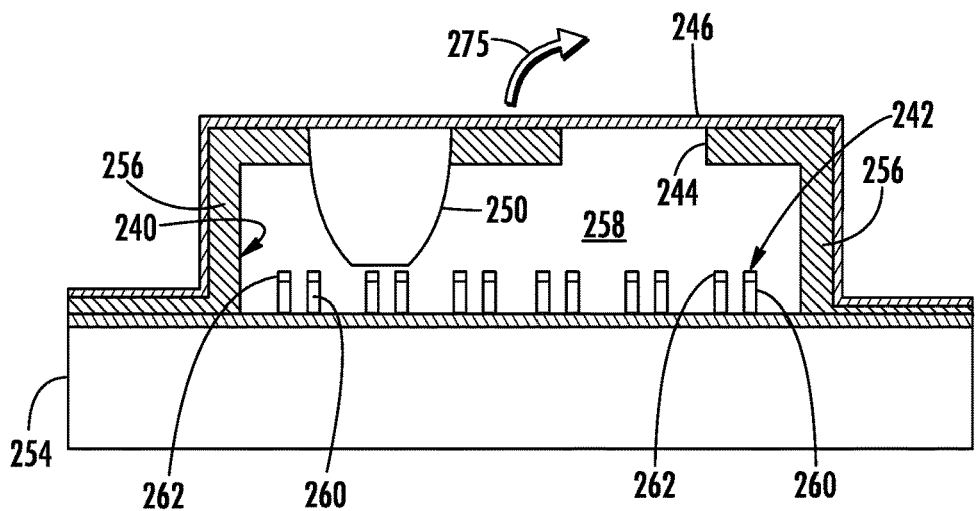
FIGS. 6-8 are sectional views illustrating an example method of using one of the example analyte detection packages of FIG. 5.
Figure 7:
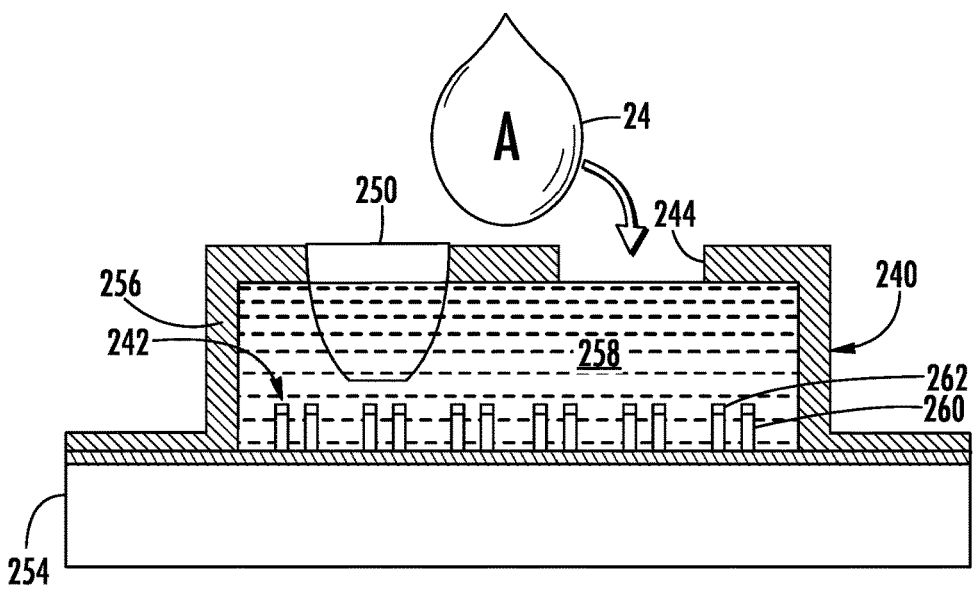

FIGS. 6-7 illustrate use of package 220 in one example. As shown by FIG. 6, seal 246 is peeled away from housing 256, such as in the direction indicated by arrow will 275. As indicated by FIG. 7, analyte 24 is deposited into interior 258 through fill opening 244.

Figure 8:
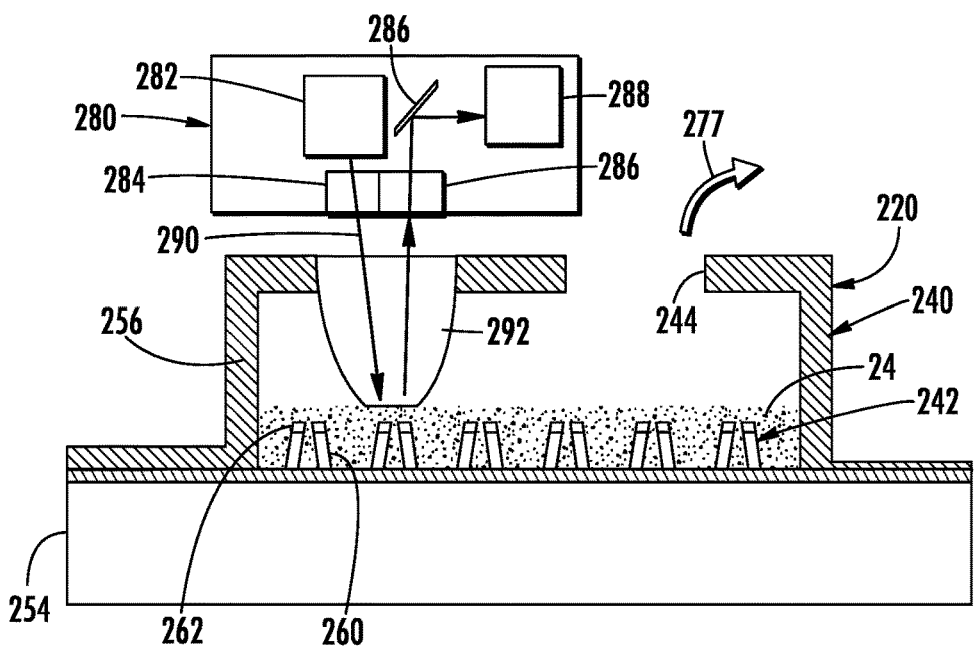

As indicated by FIG. 8, the analyte is dried or is allowed to dry or evaporate as indicated by arrow 277. As further indicated by FIG. 8, packaging 220 is presented to a detector or reader 280 which comprises a radiation emitter 282, focusing optics 284, receiving optics 286 and detector 288. Radiation emitter 282 emits photons 290 which are directed by optics 284 onto lens 250. Lens 250 focuses the radiation onto stage 242 and analyte 24. In one implementation, radiation emitter 282 comprises a laser, wherein optics 284 comprises a convex lens or other optical devices that impinge lens 250 with a column laser beam. Photons 290 are scattered by analyte 24, wherein the intensity of the scattered photons or radiation is enhanced by stage 242. The scattered photons 292 return to reader 280, where optics 286, in the form of a lens and/or mirror arrangement direct photons or 292 to a detector 288 which output signals based upon the detected photons 292. A processor, following instructions in a non-transitory computer-readable medium, receives the signals and analyzes the signals to identify or determine characteristics of analyte 24.

Figure 9:
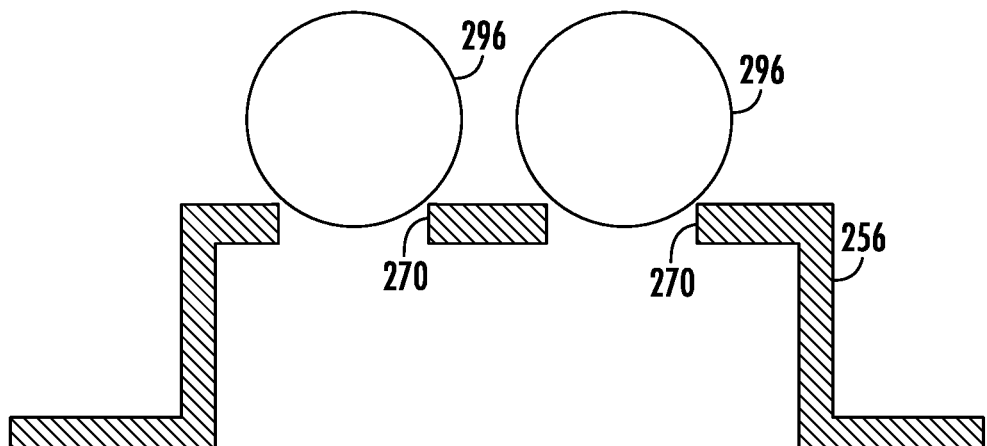
FIGS. 9-11 are sectional views illustrating an example method of forming example lenses as part of an example analyte detection package.
Figure 10:
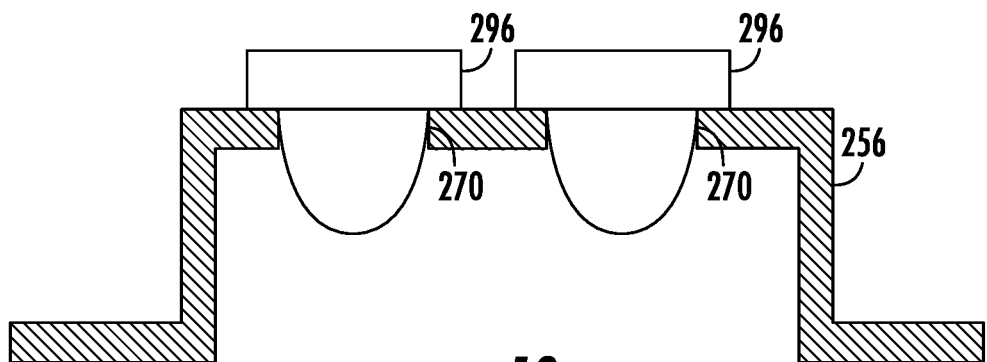
Figure 11:
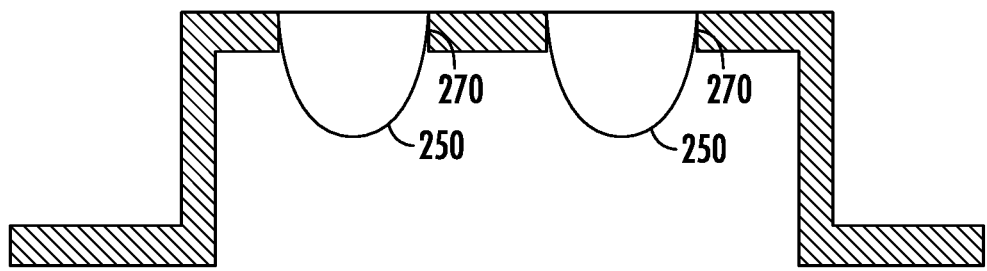

FIGS. 9-11 schematically illustrate one example method for providing packaging, such as packing 220, with a lens, such as lens 250. Although FIGS. 9-11 illustrate the concurrent formation of multiple lenses 250, in other implementations, a single lens 250 may be formed by the same process, wherein the other aperture is not filled, but remains for use as fill opening 244. Although FIGS. 9-10 illustrate the formation of lens 250 on housing 256 prior to housing 256 being joined to substrate 254, in other implementations, the formation of lens 250 on housing 255 may be formed after housing 256 has been joined or connected to substrate 254 and/or stage 242. In other implementations, lens 250 may be provided as part of package 220 in other fashions.

As shown by FIG. 9, housing 256 is provided. Housing 256 comprises apertures 270. In one implementation, housing 256 is formed using a glass mandrel (e.g., soda-lime-silica glass or wafer) having pattern(s) and/or structure(s) to produce associated structure(s) and/or aperture(s) of the housing 256. In some examples, the pattern(s) and/or structure(s) is produced by applying photoresist that is patterned and then removed by wet etching. In some examples, the mandrel undergoes a number of processes to produce the housing 256 (e.g., a mandrel mask) such as a physical vapor deposition (PVD) process, a plasma-enhanced chemical vapor deposition (PECVD) process, a chemical vapor process (CVP) and/or a photolithography process. The PVD process may be used to sputter a layer of stainless steel and/or chrome on the mandrel. The CVP and/or the PECVD process may be used to deposit a silicon carbide layer on the mandrel. The stainless steel layer and/or chrome layer and the photolithography process may be used to pattern the silicon carbide layer. In some examples, the mandrel is immersed in a plating bath (e.g., nickel, gold and/or platinum plating bath) where the bath plates the entire surface of the mandrel except where the nonconductive silicon carbide is located. In examples in which the plating bath is a nickel plating bath, the nickel from the bath defines the patterns, shapes and/or features of the housing 256.

During plating, the nickel plates over the edges of the silicon carbide and defines structures (e.g., orifice nozzle(s), pattern(s), aperture(s), bore(s), etc.) of the housing 256. After a particular amount of time has elapsed and the mandrel and the housing 256 are removed from the plating bath, the housing 256 (e.g., a nickel layer) may be removed and/or peeled off of the mandrel and electroplated with, for example, gold, palladium and/or rhodium. The size and/or thicknesses of the housing 256 and/or the associated bore(s) and/or nozzle(s) may be proportional to the amount of time that the mandrel is immersed in the nickel bath, the pad size (e.g., a silicon carbide pad that defines the bore size), etc. The housing 256 may be coupled to the wafer and/or substrate 254 using a gang-bond process (e.g., thermocompression bonding that bonds metals).

As further shown by FIG. 9, lens forming material 296 is deposited onto housing 256 opposite or onto apertures 270. The lens forming material 296 may comprise a polymer or other suitable transparent material such as polyethylene, various resins and glass. As shown by FIG. 10, the lens forming material 296 is melted, wherein gravity results in the melted lens forming material flowing through and being suspended by housing 256. Although FIGS. 9 and 10 illustrate the solid or semi-solid lens forming material being first deposited upon housing 256 and being subsequent melted, in other implementations, the lens forming material 296 may be melted or may be in a liquid form prior to being deposited upon housing 256.

The profile of each lens 250 may be controlled through various process parameters. For example, the profile and characteristics of the final lens 250 may be altered by altering the temperature and hence viscosity of the lens forming material 296, the time for the lens forming material 296 to pass through apertures 270 and form the final lens profile, and the direction in which housing 256 is supported during the formation of lens 250 (as will be described hereafter with respect to FIG. 12).

As shown by FIG. 11, upon solidification or substantial solidification of the lens forming material, the top of the lens forming material 296 projecting above surface 270 of housing 256 is shaved or removed so as to be flush with surface 270. In other implementations, the top of the lens forming material 296 is not shaped, but is allowed to maintain the shape following solidification showing FIG. 10. In some implementations, the lens forming material 296 projecting above housing 256 is shaped as desired to alter the performance characteristics of lens 250.

Figure 12:
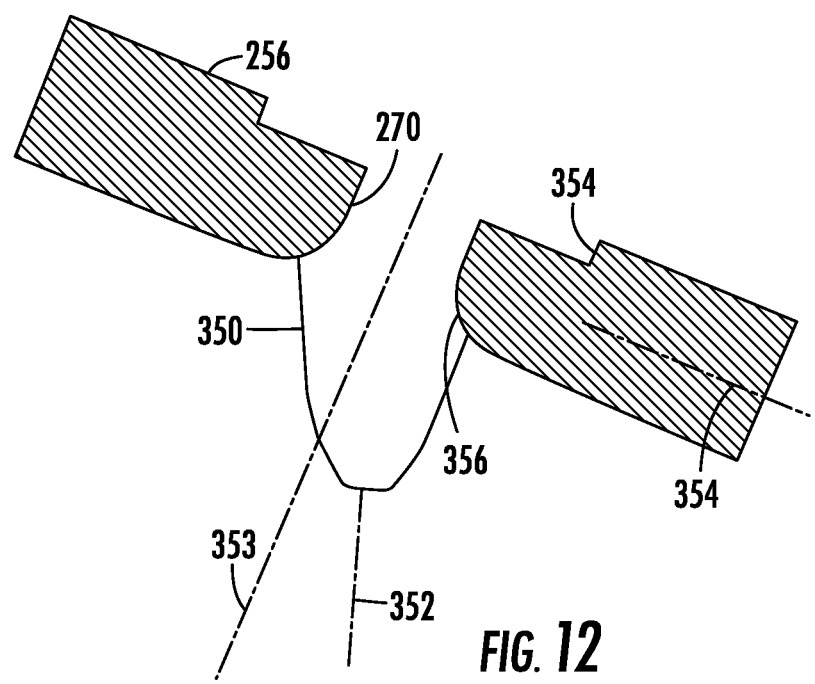
FIG. 12 is a sectional view illustrating an example method for forming another example lens as part of an example analyte detection package.

FIG. 12 illustrates an example of how process parameters may be varied to control the characteristics of the lens being formed upon the package. FIG. 12 illustrates lens 350 formed by tilting housing 256 (a portion of which is shown) oblique to the vertical axis or the direction of gravity as the lens forming material (described above) is permitted to flow through aperture 270 prior to solidification. Similar to that shown in FIG. 11, a portion of the lens forming material extending above the upper surface to 70 shaved or removed. As a result, lens 250 has a centerline 352 that is oblique or that is angled relative to the centerline 353 of aperture 270 and the plane 354 in which housing 256 extends.

In the example shown in FIG. 12, housing 256 has a countersink 354 that is established during plating. Housing 256 further has an upwardly extending funnel shape or curvature 356 about an underside of aperture 270. In one implementation, the funnel shape or curvature 356 is formed during plating growth of housing 256 as described above. This profile of housing 256 facilitates the forming of lens 350 or lens 250. The profile of housing 256 shown in FIG. 12 may be provided on housing 256 of each of packages 220 described above.

Figure 13:
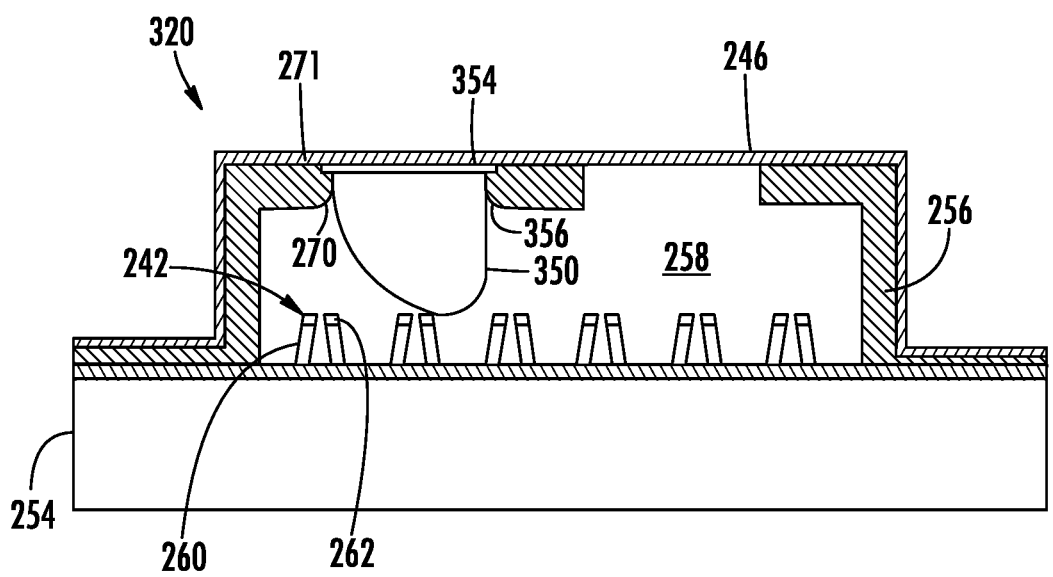
FIG. 13 is a sectional view of an example analyte detection package including a lens formed according to the method shown in FIG. 12.

FIG. 13 illustrates package 320 formed with lens 350.

Package 320 is similar to package 220 in all respects except for the provision of lens 350 in place of lens 250. As shown by FIG. 13, lens 350 focuses incident radiation at an angle towards stage 242 and the supported analyte. As a result, different focal depths may be provided for lens 350. In addition, due to the different angles at which the radiation impinges the analyte within packaging 320 during testing, different analysis may be carried out with respect to the analyte being tested.

Figure 14:
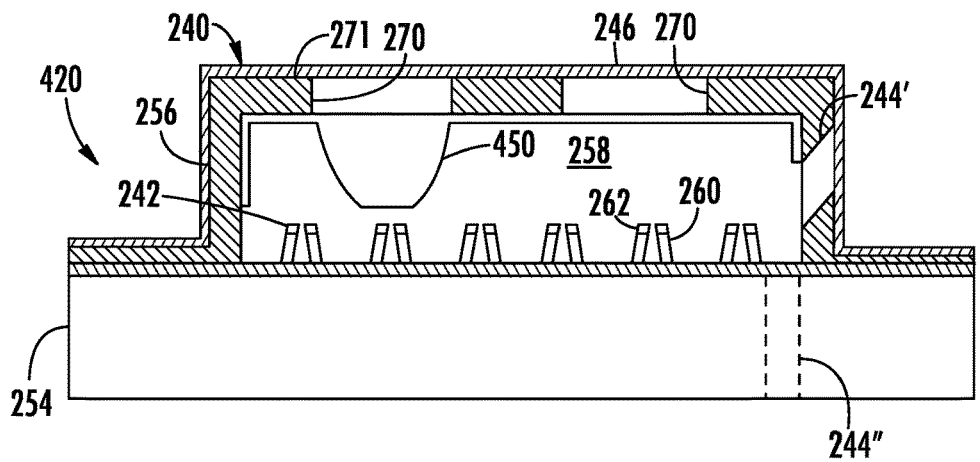
FIG. 14 is a sectional view of another example analyte detection package.

FIGS. 14-17 illustrate alternative implementations of package 20, 220 and 320. Those components or elements of such alternative implementations that correspond to packaging 220 are numbered similarly. FIG. 14 illustrates analyte detection package 420, another implementation of package 220. Package 420 is similar to package to 20 except that package 420 comprises fill opening 244' and a plurality of lenses 450 in place of fill opening 244 and lens 250, respectively.

Lenses 450 are similar to lens 250 except that lenses 450 are mounted, joined to or otherwise provided on an interior surface of housing 256. In one implementation, lenses 450 are separately formed and then mounted, bonded, fused, welded or otherwise secured to the underside of housing 256. For example, in one implementation, lenses 450 are molded prior to being mounted to housing 256. In one implementation, lenses 450 are shaped through material removal processes prior to being joined to housing 256. In yet another implementation, apertures 270 are temporarily plugged as lenses 450 are molded or otherwise formed on the underside of housing 256. Although packing 420 is illustrated as comprising multiple lenses 450, in other implementations, package 420 may alternatively provide a single lens 450.

Figure 15:
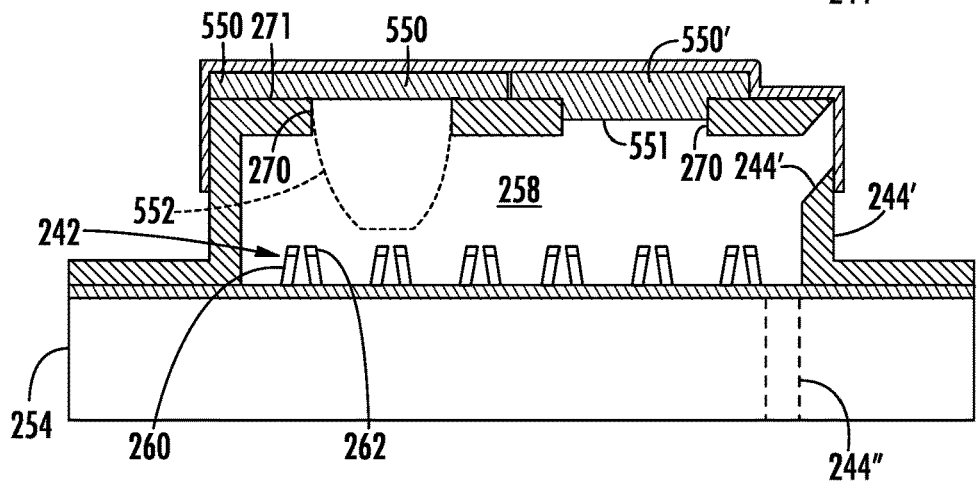
FIG. 15 is a sectional view of another example analyte detection package.

FIG. 15 illustrates analyte detection package 520, another implementation of package 220. Package 520 is similar to package 220 except that package 520 comprises lenses 550, 550' in place of lens 250. Lenses 550, 550' are similar to lens 250 except that lenses 550, 550' are mounted, joined to or otherwise provided on surface 271 of housing 256. In one implementation, lenses 550, 550' are separately formed and then mounted, bonded, fused, welded or otherwise secured to the outer surface 271 of housing 256. For example, in one implementation, lenses 550, 550' are molded prior to being mounted to housing 256. In one implementation, lenses 550, 550' are shaped through material removal processes prior to being joined to housing 256. In yet another implementation, apertures 270 are temporarily plugged as lenses 550, 550' are molded or otherwise formed on the outer surface 271 of housing 256.

In the example illustrated, lens 550 extends along surface 271, across but above or outside of aperture 270. Lens 550' is similar to lens 550 except that lens 550' is T-shaped, having a lower projecting portion 551 that is received within aperture 270 and extends closer to stage 242. In one such implementation, lens 550' may be separately formed and inserted over and into aperture 270. In one such implementation, lens 550' may be removable with respect to aperture 270, facilitating the exchange of lenses 550' for customized radiation focusing and customized analyte detection and analysis. In one implementation, the downward projecting portion 551 does not extend completely through aperture 270, but facilitates alignment, positioning and retention of lens 550' with respect to aperture 270. As shown by broken lines, in one implementation, lens 550 may additionally have a downward protruberance or downward projecting portion 552 that extends completely through aperture 270 into interior 258 for enhanced focusing of electromagnetic radiation or light. Although packing 520 is illustrated as comprising multiple different lenses 550, 550', in other implementations, package 520 may alternatively comprise a plurality of similar lenses or may comprise a single lens 550 or 550'.

Figure 16:
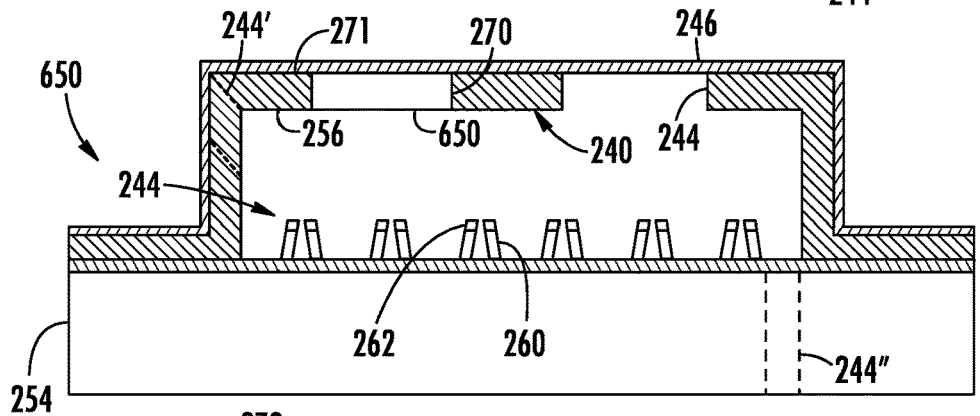
FIG. 16 is a sectional view of another example analyte detection package.

FIG. 16 illustrates analyte detection package 650, another implementation of analyte detection package 220. Package 520 is similar to package 220 except that package 520 comprises lens 650 in place of lens 250. Lens 650 comprises an optical element completely contained within aperture 270. In one implementation, lens 650 is concurrently fabricated with the fabrication of housing 256. In another implementation, lens 650 is secured to a constructed housing 256 by being welded, bonded, fused, snapped into rather the rise retained in place within aperture 270. In one implementation, lens 650 may comprise a spherical or hemispherical ball lens inserted into the aperture 270 and secured in place, such as with an adhesive, snap fit, socket or the like. Similar to lens 250, lens 650 focuses incident radiation or light towards stage 242 and the analyte being tested.

Figure 17:
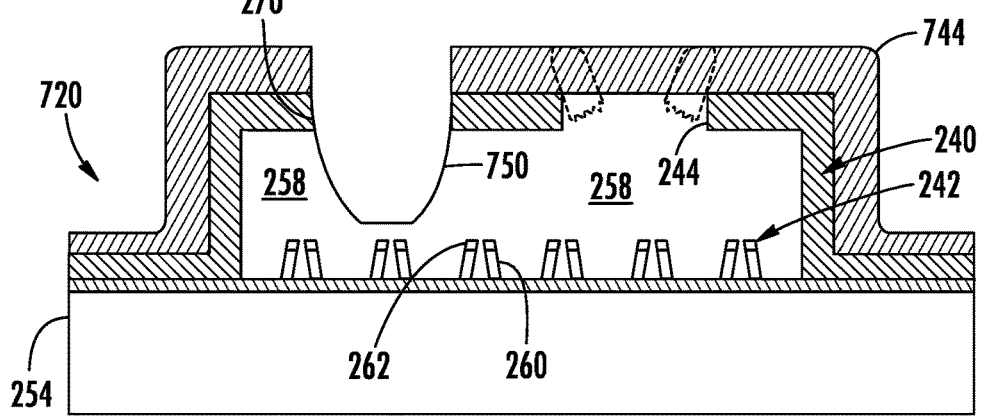
FIG. 17 is a sectional view of another example analyte detection package.

FIG. 17 illustrates analyte detection package 720, another implementation of analyte detection package 220. Package 720 is similar to package 220 except that package 720 comprises top or lid 744 in place of seal 246 and lens 250. Lid 744 comprises a structure separate from housing 256 which is sized and shaped so as to overlie housing 256 while supporting a lens 750 across or opposite to aperture 270. Lens 750 is itself similar to lens 250 described above except that lens 750 is at least partially supported by lid 744. In one implementation, lid 744 is fixedly or permanently mounted to, or otherwise secured over, housing 256 with lens 750 extending through aperture 270 into interior 258. In another implementation, lid 744 is removably mounted to or secured over housing 256 with lens 750 being removably positioned through aperture 270. For example, in one implementation, lid 744 may be snapped in place over top of housing 256. In yet another implementation, lid 744 may be formed or molded over housing 256.

In the example illustrated, lid 744 extends across and over fill opening 244, closing or sealing fill opening 244 until use of package 720. As shown by broken lines, in one implementation, portions of lid 744 that align with fill opening 244 when lid 744 is positioned over housing 256 are breakable in that such portions may be punctured, broken or peeled away to provide access to the underlying fill opening 244 when package 720 is to be used. In other implementations, lid 744 may comprise an aperture or opening which aligns with fill opening 244 when lid 744 is positioned over housing 256. In such an implementation, package 720 may additionally comprise seal 246 which extends on top of lid 744 to seal the opening of lid 744 that is aligned with fill opening 244. In yet another implementation, packaging 720 comprises seal 246 between housing 256 and lid 744, wherein the seal 246 may be peeled away, punctured, torn otherwise severed or broken, allowing analyte to be deposited within interior 258 through the opening of lid 744, through the peeled away, punctured or torn seal 246 and through fill opening 244 formed within housing 256. Although lid 744 is illustrated as comprising a lens 750 which is similar to lens 250, in other implementations, lid 744 alternatively comprise a lens similar to lens 550, lens 550' or lens 550 with the additional projection 552.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An analyte detection package comprising:
    a chamber;
    a surface-enhanced luminescence analyte stage within the chamber; and
    a lens integrated as part of the package to focus radiation onto the analyte stage, wherein the lens forms an interior surface of the chamber.

2. The analyte detection package of claim 1 further comprising:
    a substrate;
    a housing extending from the substrate to form the chamber between the housing and the substrate, the housing comprising an aperture, wherein the lens is supported by the housing.

3. The analyte detection package of claim 2, wherein the lens projects beyond the aperture into the interior of the chamber towards the surface-enhanced luminescence analyte stage within the chamber.

4. The analyte detection package of claim 3, wherein the lens has a centerline normal to the substrate.

5. The analyte detection package of claim 3, wherein the lens has a centerline oblique to the substrate.

6. The analyte detection package of claim 2 further comprising a fill opening communicating with an interior of the chamber, the fill opening extending through a ceiling of the package opposite the substrate.

7. The analyte detection package of claim 1 further comprising:
    a substrate;
    a housing extending from the substrate to form the chamber between the housing and the substrate, the housing comprising an aperture; and
    a lid supported by the analyte detection package over the housing, the lid supporting the lens opposite the aperture.

8. The analyte detection package of claim 7, wherein the lid is removably mounted over the housing.

9. The analyte detection package of claim 1, wherein the surface-enhanced luminescence analyte stage comprises surface-enhanced Raman spectroscopy structures.

10. A method comprising:
    providing an analyte detection package having a chamber, a surface enhanced luminescence analyte stage within the chamber and an opening in communication with an interior of the chamber; and
    connecting a lens to the analyte detection package such that the lens is integrated as part of the package and extends opposite the opening, wherein connecting the lens to the analyte detection package comprises filling the opening with a lens forming material.

11. The method of claim 10, wherein the surface enhanced luminescence analyte stage comprises surface-enhanced Raman spectroscopy structures.

12. A method comprising:
    filling a chamber of an analyte detection package with an analyte such that the analyte is in contact with a surface enhanced luminescence stage within the chamber; and
    focusing radiation onto the analyte within the chamber with a lens integrated as part of the analyte detection package, wherein the lens forms an interior surface of the chamber.

13. The analyte detection package of claim 7, wherein the lens projects from the lid, through and beyond the aperture into the chamber opposite the surface-enhanced luminescence analyte stage.

14. The analyte detection package of claim 7, wherein the housing comprises a fill opening and wherein the lid comprises a lid portion extending across and sealing the fill opening.

15. The analyte detection package of claim 14, wherein the lid portion is puncturable or tearable with respect to surrounding portions of the lid to expose and open the fill opening.

16. The analyte detection package of claim 1 comprising a lid having a lid portion forming an interior surface of the chamber, wherein the lid portion is puncturable or tearable with respect to surrounding portions of the lid to provide access to an interior of the chamber.

17. The analyte detection package of claim 1, wherein the lens is T-shaped.

18. The analyte detection package of claim 2, wherein the lens is mounted to an interior surface of the housing within the chamber and directly underlying the aperture.

19. The analyte detection package of claim 1, wherein the lens comprises a bulbous protuberance projecting into the chamber towards the surface enhanced luminescence analyte stage.

20. The method of claim 10, wherein the filling of the opening with the lens forming material comprises flowing the lens forming material through the opening while the lens forming material is in a liquid form.

\* \* \* \* \*